United States Patent

Saito et al.

[11] Patent Number: 5,825,739
[45] Date of Patent: Oct. 20, 1998

[54] RECORDING METHOD AND APPARATUS FOR RECORDING MEDIUM

[75] Inventors: Yuji Saito; Takayuki Kaneko, both of Tokyo, Japan

[73] Assignee: Sony Corporation, Tokyo, Japan

[21] Appl. No.: 849,784

[22] PCT Filed: Oct. 21, 1996

[86] PCT No.: PCT/JP96/03049

§ 371 Date: Jun. 9, 1997

§ 102(e) Date: Jun. 9, 1997

[87] PCT Pub. No.: WO97/15052

PCT Pub. Date: Apr. 24, 1997

[30] Foreign Application Priority Data

Oct. 20, 1995 [JP] Japan .................................. 7-273147

[51] Int. Cl.$^6$ .......................................................... G11B 7/00
[52] U.S. Cl. ................................ 369/83; 369/60; 369/58
[58] Field of Search ................................... 369/83, 84, 47, 369/48, 49, 50, 54, 58, 59, 60, 32

[56] References Cited

U.S. PATENT DOCUMENTS

| 5,289,450 | 2/1994 | Mizumoto et al. | 369/58 X |
| 5,381,292 | 1/1995 | Hira | 369/58 X |
| 5,515,351 | 5/1996 | Nonaka et al. | 369/58 |

FOREIGN PATENT DOCUMENTS

| 7-192436 | 7/1995 | Japan . |
| 8-106765 | 4/1996 | Japan . |

*Primary Examiner*—Muhammad N. Edun
*Attorney, Agent, or Firm*—Limbach & Limbach LLP

[57] ABSTRACT

A recording and/or reproducing apparatus for a recording medium includes a head unit for recording on and/or reading out data from a recording medium having a data recording area for data recording/reproduction and a management data recording area for recording management data for management of the data recorded in said data recording area, and a first storage unit for storing data read out from the recording medium by the head unit during reproduction from the recording medium. During recording on the recording medium, the first storage unit temporarily stores recording data supplied to the head unit and the management data read out from the recording medium. The apparatus also includes a second storage unit for storing the management data read out from the recording medium and a control unit for controlling the head unit based on the management data stored in the first storage unit for effecting recording on or reproduction from the recording medium. During recording the data on the recording medium, the control unit causes data stored on the first storage unit to be temporarily accumulated and to be subsequently supplied to the head unit for performing a recording operation. During reproduction of data from the recording medium, the control unit causes data read out by the head unit to be temporarily stored in the first storage unit. The control unit performs an editing operation on data recorded in the data storage area of the recording medium based on the management data stored in the first storage unit for updating the management data stored in the first storage unit. During cancellation of the editing operation, the control unit causes the management data stored in the second storage unit to be transferred to the first storage unit. If it is desired to cancel the editing operation, the control unit causes the management data stored in the second memory unit to be transferred to the first storage unit.

10 Claims, 6 Drawing Sheets

5,825,739

RECORDING METHOD AND APPARATUS FOR RECORDING MEDIUM

TECHNICAL FIELD

This invention relates to a recording and/or reproducing apparatus and a recording and/or reproducing method for recording data and management data therefor on a recording medium, such as an optical disc, or reproducing data and management data therefor recorded on the recording medium.

BACKGROUND ART

Up to now, a disc-shaped recording medium, such as an optical disc, for recording and/or reproducing various data, such as music data, has been in use as a recording medium capable of optically recording and/or reproducing data.

As this type of the optical disc, a so-called compact disc, having a diameter of 12 cm or 8 cm, is in use. This compact disc has a data recording area for recording data, such as music data or speech data, and a management data recording area for recording management data used for management of the data recorded in the data area. The management data recording area is provided on the rim of a center aperture of the optical disc towards the inner rim of the data recording area thereof. In the management data recording area are recorded a recording start address, a recording end address or the absolute time information for the music data or speech data recorded in the data recording area. The management data, such as recording start address, a recording end address or the absolute time information, is termed the table-of-contents data, or TOC data.

If, in a disc recording/reproducing apparatus, recording and/or reproducing data using such optical disc, data is recorded or reproduced on or from the optical disc, the TOC data is first read out from the management data recording area so as to be temporarily stored in a memory provided in the apparatus.

For reproducing data recorded on this optical disc, a head device (so-called optical disc) is moved on the basis of the data recording start address for desired data n the read-out TOC data for starting data read-out and reproducing operations.

For recording new data on the optical disc, the leading position of an unrecorded area in the data area of the optical disc is detected from the TOC data so that new data is recorded as from the leading position of the unrecorded area in the data area. The TOC data concerning the recording start address and the recording end address for the data newly recorded by the present recording operation are then added to the TOC data stored in the memory data for updating the TOC data on the memory. The updated TOC data are read out from the memory for recording on the management data recording area on the optical disc. Thus the TOC data previously recorded in the management data recording area of the optical disc is replaced by the updated TOC data.

With the present disc recording/reproducing apparatus, it is possible to edit previously recorded data. With the present editing operation, it is possible to erase data, divide one data into plural data, connect two or more data into one data, move data, append title to the data, or to modify a title.

This editing operation can be easily realized solely by changing the TOC data without changing actually recorded data. For erasing data on an optical disc, for example, it suffices to erase the TOC data concerning the data desired to be erased. For dividing one data into plural data, it suffices to divide the TOC data for the data desired to be divided into plural TOC data. At which portion of a data the data is to be divided is desegrated by the user. For connecting two or more data, it suffices to change the TOC data of the data desired to be connected, with the recording start address of the leading data as the recording start address of the connected data and with the recording end address of the terminal data as the recording end address of the connected data. Which data should be connected to which data is designated by the user. For moving data, for example, the first data, it suffices to rewrite a portion specifying which number data in the TOC data is the first data so that the first data will become the fifth data. For appending a title to data or modifying a title, it suffices to append a title to or modify data equivalent to a title of the TOC data.

The editing operation is disclosed in the specification and drawings of WO 95/04990.

The above-mentioned change of the TOC data accompanying the editing operation including erasure, division, connection or movement of data or title appendage, is performed on the memory. Specifically, during the editing operation, the TOC data is modified or updated on a memory of a controller controlling the recording/reproducing apparatus and the TOC data in the management data recording area on the optical disc is rewritten when the editing comes to a close.

Meanwhile, for canceling the editing operation on the disc recording/reproducing apparatus, if the editing or updating of the TOC data is interrupted before the editing operation comes to a close, the TOC data read out from the optical disc is not edited nor updated. However, directly after the editing operation, the TOC data read out from the optical disc is edited or updated, so that the TOC data cannot be restored to the original state.

DISCLOSURE OF THE INVENTION

It is therefore an object of the present invention to provide a recording and/or reproducing apparatus and a recording and/or reproducing method for recording data for a recording medium wherein the editing operation of the recorded data can be canceled for reversion to the pre-editing data.

A recording and/or reproducing apparatus for a recording medium, proposed for accomplishing the above object, includes head means for recording on and/or reading out data from a recording medium having a data recording area for data recording/reproduction and a management data recording area for recording management data for management of the data recorded in the data recording area, and first storage means for storing data read out from the recording medium by the head means during reproduction from the recording medium. The first storage means during recording on the recording medium temporarily stores recording data supplied to the head means and stores the management data read out from the recording medium. The apparatus also includes second storage means for storing the management data read out from the recording medium and control means for controlling the head means based on the management data stored in the first storage means for effecting recording on or reproduction from the recording medium. The control means during recording the data on the recording medium causes data stored on the first storage means to be temporarily accumulated and to be subsequently supplied to the head means for performing a recording operation. The control means during reproduction of data from the recording medium causes data read out by the head means to be temporarily stored in the first storage means. The control means performs an editing operation on data recorded in the data storage area of the recording medium based on the management data stored in the first storage means for updating the management data stored in the first storage means. The control means during cancellation of the editing operation causes the management data stored in the second storage means to be transferred to the first storage means.

When performing the editing operation on data recorded in the data recording area of the recording medium based on the management data stored in the first storage means, the control means causes the management data stored in the first storage means to be transferred to the second storage means and subsequently performs the editing operation for updating the management data stored in the first storage means.

A method for recording on and/or reproducing from a recording medium according to the present invention includes reading out management data from a recording medium for storage in first storage means, in which the recording medium having a data recording area for data recording or reproduction by head means and a management data recording area having recorded therein the management data for data recorded in the data recording area. The method further includes transferring the management data stored in the first storage means to a second storage means for storage therein when performing an editing operation on data recorded in the data recording area of the recording medium based on the management data stored in the first storage means, and subsequently performing the editing operation for updating the management data stored in the first storage means, while transferring, on entry of cancellation of the editing operation during or after the end of the editing operation, the management data stored in the second storage means to the first storage means.

BEST MODE FOR CARRYING OUT THE INVENTION

Figure 1:
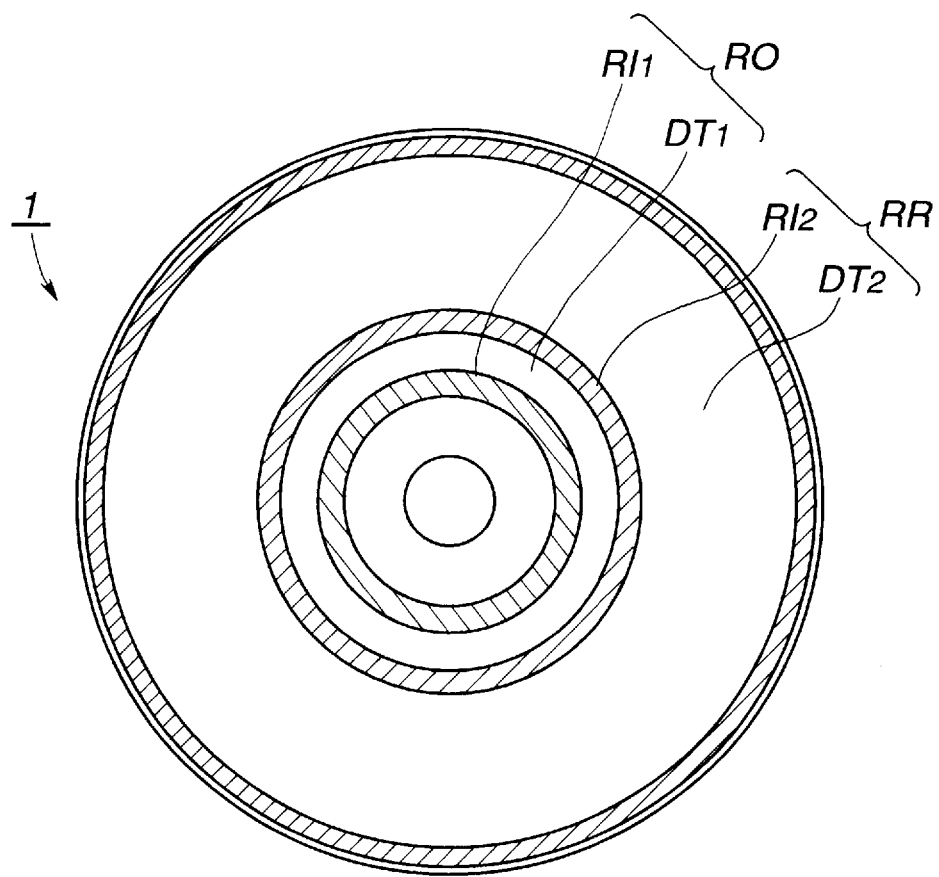
FIG. 1 is a plan view showing a recording area of an optical disc employed in the present invention.

Referring to the drawings, preferred embodiments of the disc recording/reproducing apparatus for a recording medium according to the present invention will be explained in detail.

In the following embodiments, the present invention is applied to a disc recording/reproducing apparatus employing an optical disc as a recording medium. The optical disc employed in the present disc recording/reproducing apparatus is a magneto-optical disc in which data is recorded thermomagnetically and the recorded data is reproduced on radiation of a light beam.

The structure of an optical disc employed for the present disc recording/reproducing apparatus is hereinafter explained.

The optical disc 1 has a read-only area RO and a recording/read area RR, as shown in FIG. 1. The read-only area RO is an area in which desired data is pre-recorded, and is made up of a data recording area $DT_1$ in which data such as music data or speech data is recorded, and a management data recording area $RI_1$ arranged inwardly of the data recording area $DT_1$. In the management data recording area $RI_1$ are recorded the recording start address, recording end address and the absolute time information of the music data or the speech data recorded in the data recording area $DT_1$. The management data, such as the recording start address, recording end address and the absolute time information, are termed table-of-contents (TOC) data. Each data recorded in the data recording area $DT_1$ and in the management data recording area $RI_1$ are recorded as a pit string consisting in an array of micro-sized crests and valleys.

The recording/reproducing area RR, in which the user can freely write or re-write data, is made up of a data recording area $DT_2$ for recording data such as music data or speech data and a management data recording area $RI_2$ arranged inwardly of the data recording area $DT_2$.

Figure 2:
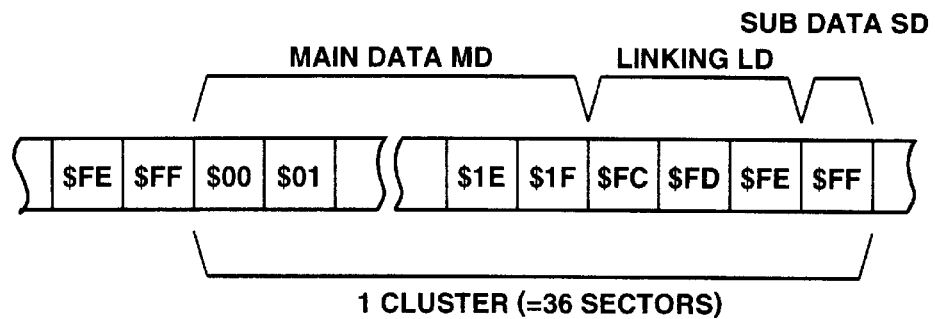
FIG. 2 shows the recording state of recording data of one cluster.

The data is recorded in the recording/reproducing area RR in terms of a cluster, made up of 32 sectors of main data MD, three sectors of linking data LD and a sector of sub-data SD, totaling at 36 sectors, as a unit for recording, as shown in FIG. 2. The data pre-recorded in the read-only area TO is also arrayed on the cluster basis.

Figure 3:
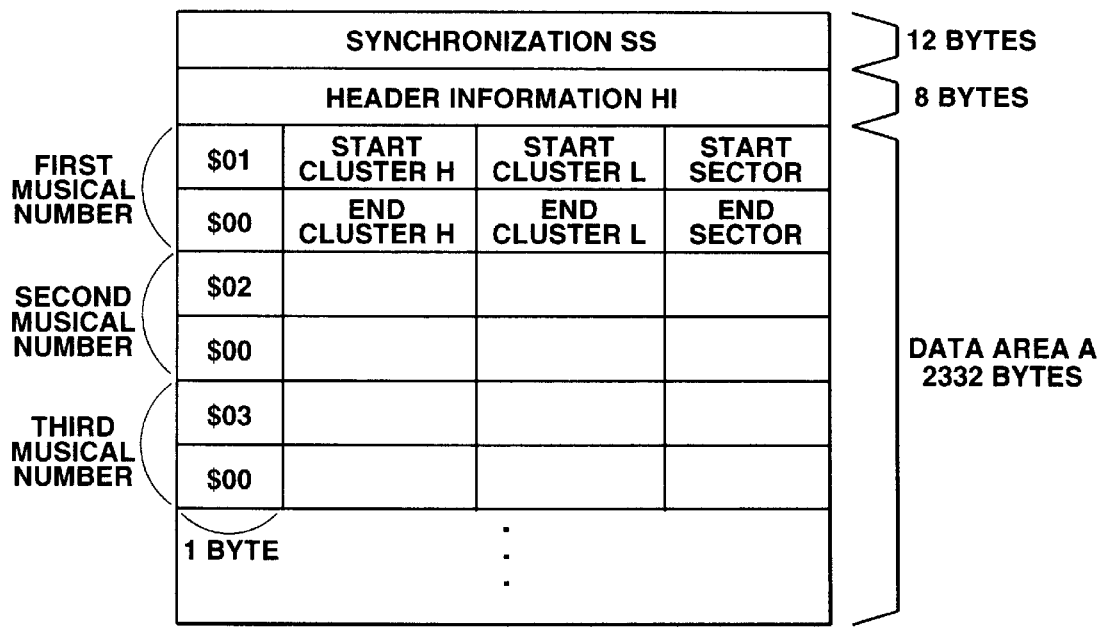
FIG. 3 illustrates the recording state of the TOC data and a schematic structure of a RAM.

In a sector specified by the sector number 00, in the management data recording area $RI_2$ of the recording/reproducing area RR, is recorded the information for managing the data recorded area and non-data-recorded area in the data recording area $DT_2$, more specifically, the TOC data, such as the recording start address, recording end address or the absolute time information of the music data or speech data recorded in the data recording area $DT_2$. This TOC data is made up of 12-byte synchronization signal SS, an 8-byte header information HI, and 2332 byte data recorded in the data area AD, totaling at 2332 bytes, as shown in FIG. 3. In the data area DA is recorded TOC data, made up of 8 bytes for each musical number, from one musical number to another. The TOC data for each musical number is made up of the serial number of the recording data, upper order and lower order bytes of a start cluster specifying the recording start address, upper order and lower order bytes of an end cluster specifying the recording end address, and an end sector number. This TOC data is re-written for each recording or editing operation of data for the data area $DT_2$.

A data recording/reproducing apparatus, employing an optical disc 1 having the above-described read-only area TO and a recording/reproducing area RR as a recording medium, is hereinafter explained.

Figure 4:
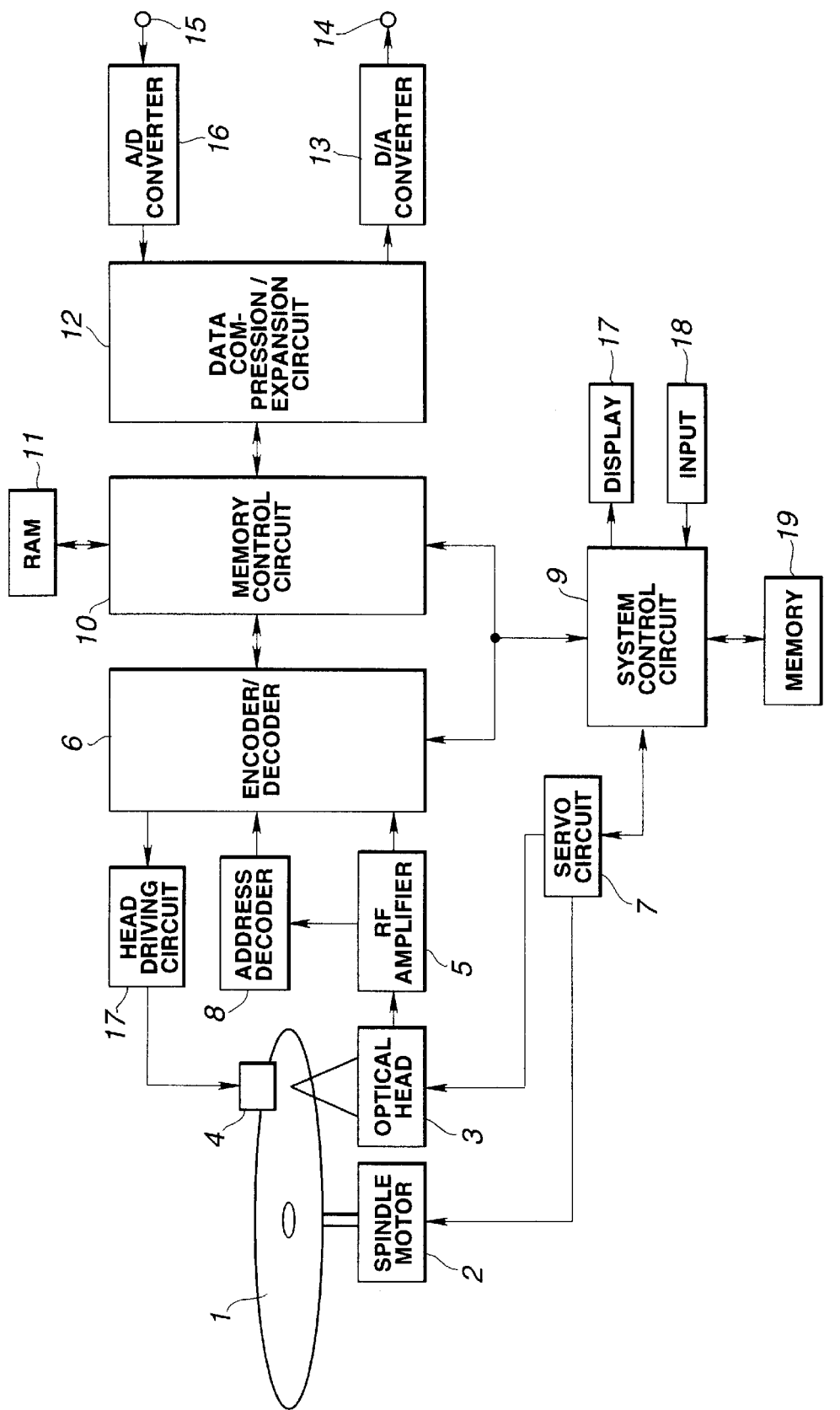
FIG. 4 is a block diagram showing a disc recording/reproducing apparatus according to the present invention.

This data recording/reproducing apparatus includes a spindle motor 2 for clamping and rotationally driving the optical disc 1 as a recording medium, an optical head 3 for radiating a light beam on the optical disc 1 run in rotation by this spindle motor 2 and a magnetic head 4 arranged facing the optical head 3 with the optical disc 1 in-between, as shown in FIG. 4.

The optical head 3 radiates a high-level laser beam for heating a signal recording layer of the optical disc 1 to a Curie temperature during data recording, while radiating a low-level laser beam during laser reproduction for detecting data by the magnetic Kerr effect from the return light reflected from the optical disc 1. The optical head 3, outputting the laser beam to be radiated on the optical disc 1 and detecting the return light from the optical disc 1 for detecting the data, includes an optical system made up of a semiconductor laser for outputting the laser beam, an objective lens for condensing the laser beam for radiation on the optical disc 1 and a polarizing beam splitter for separating the return light reflected from the optical disc 1, and a photodetector for detecting the return light. The objective lens constituting the optical head 3 is driven by a biaxal actuator so as to be driven along the optical axis and in a direction parallel to the plane of the optical disc 1 perpendicular to the optical axis in order for the light beam radiated via this objective lens to be focused on and scan the recording track on the optical disc 1.

The magnetic head 4 impresses the magnetic field modulated in accordance with the data to be recorded on the recording layer of the optical disc 1. The magnetic head 4 is fed along the radius of the optical disc 1 by a head feed unit in synchronism with the optical head 3.

For reproducing data recorded on the optical disc 1 by the present disc recording/reproducing apparatus, RF signals detected by the optical head 3 are supplied to an RF amplifier 5. The RF amplifier 5 processes the RF signals supplied thereto and converts the signals into bi-level signals for separating and generating tracking error signals, focusing error signals, playback signals, absolute position information and the address information. The generated playback signals are sent to an encoder/decoder 6. The tracking error signals and the focusing error signals are supplied to a servo circuit 7. The address information is supplied to an address decoder 8. The absolute position information, recorded as a pre-groove on the optical disc 1, is supplied to a system controlling circuit 9 constructed by, for example, a microcomputer. The TOC data and the data pre-recorded on the optical disc 1 in the form of, for example, a pre-groove, can be reproduced by the optical head 3, whether these prerecorded data is recorded magnetically or as pre-bits.

The servo circuit 7 generates various control signals from the tracking error signals, focusing error signals supplied thereto, track jump commands or seek commands from the system controlling circuit 9 or the rotational speed detection information for the spindle motor 2 and controls the biaxial actuator and the head feed unit for effecting focusing control and tracking control. In addition, the servo circuit 7 controls the velocity of the spindle motor 2 to constant angular velocity (CAV) or to constant linear velocity (CLV).

The encoder/decoder 6, supplied with the playback data, demodulates the playback data supplied thereto, as a reverse operation of the 8–14 modulation (EFM), while error-correcting the demodulated data using an error correction code, such as cross-interleave Reed-Solomon code (CIR). The encoder/decoder 6 sends the resulting data to a random access memory (RAM) 11 which is read-write controlled by a memory control circuit 10. The RAM 11 temporarily stores the data. The data stored in the RAM 11 is read out and fed to a data companding circuit 12. The data companding circuit 12 expands the data supplied thereto, by way of a reverse operation to the speech compression, for outputting e.g., speech data. The speech data is sent to a digital/analog (D/A) converter 13 and thereby converted into analog signals which are outputted at an output terminal 14.

The subcode data, as the control operation information, and the address information, outputted by the address decoder 8, is supplied via encoder/decoder 6 to the system controller 9 so as to be used for various control operations.

The system controller 9 outputs a control signal used for controlling the operation of the semiconductor laser of the optical head 3. This control signal on/off controls an output of the semiconductor laser. During on-control, the control signal switches between a playback output in which the laser beam output is at a lower level and a recording output in which the laser beam output is at a higher level.

To an input terminal 15 of the disc recording/reproducing apparatus are supplied analog musical signals or speech signals to be recorded on the optical disc 1. The musical signals or speech signals, supplied to the input terminal 15, are converted by an analog/digital (A/D) converter 16 into digital musical or speech data which is supplied to the data companding circuit 12. This data companding circuit 12 encodes the data supplied thereto by way of data compression. The compressed data is temporarily stored by the memory controller 10 in the RAM 11. The data thus stored in the RAM 11 are read out at a pre-set timing and thence supplied to the encoder/decoder 6. The data thus supplied to the encoder/decoder 6 is encoded using CIRC and EFMed so as to be supplied as recording data to a magnetic head driving circuit 17. This magnetic head driving circuit 17 is responsive to the recording data supplied thereto to send the magnetic head driving signals to the magnetic head 4. The magnetic head 4 impresses a magnetic field, modulated in accordance with the recording data, on the optical disc 1. The system controller 9 sends a control signal in order to cause the optical head 3 to output a recording level leaser beam.

The system controller 9 is supplied from an input unit 18 with control signals of various modes for setting the recording mode, playback mode or a variety of editing modes of the disc recording/reproducing apparatus, as later explained. This system controller 9 is responsive to control signals supplied form the input unit 18 to control the optical head 3, servo circuit 7, RF amplifier 5, encoder/decoder 6, memory controller 10 and the data companding circuit 12.

The disc recording/reproducing apparatus also includes a display unit 17 configured for displaying the operating state as entered from the input unit 18, the operating state of the present recording/reproducing apparatus, the serial number of the musical number concerning recording/reproduction, playback time, current time specifying the playback position, title of the musical number being displayed or the recording date/time information.

Figure 5:
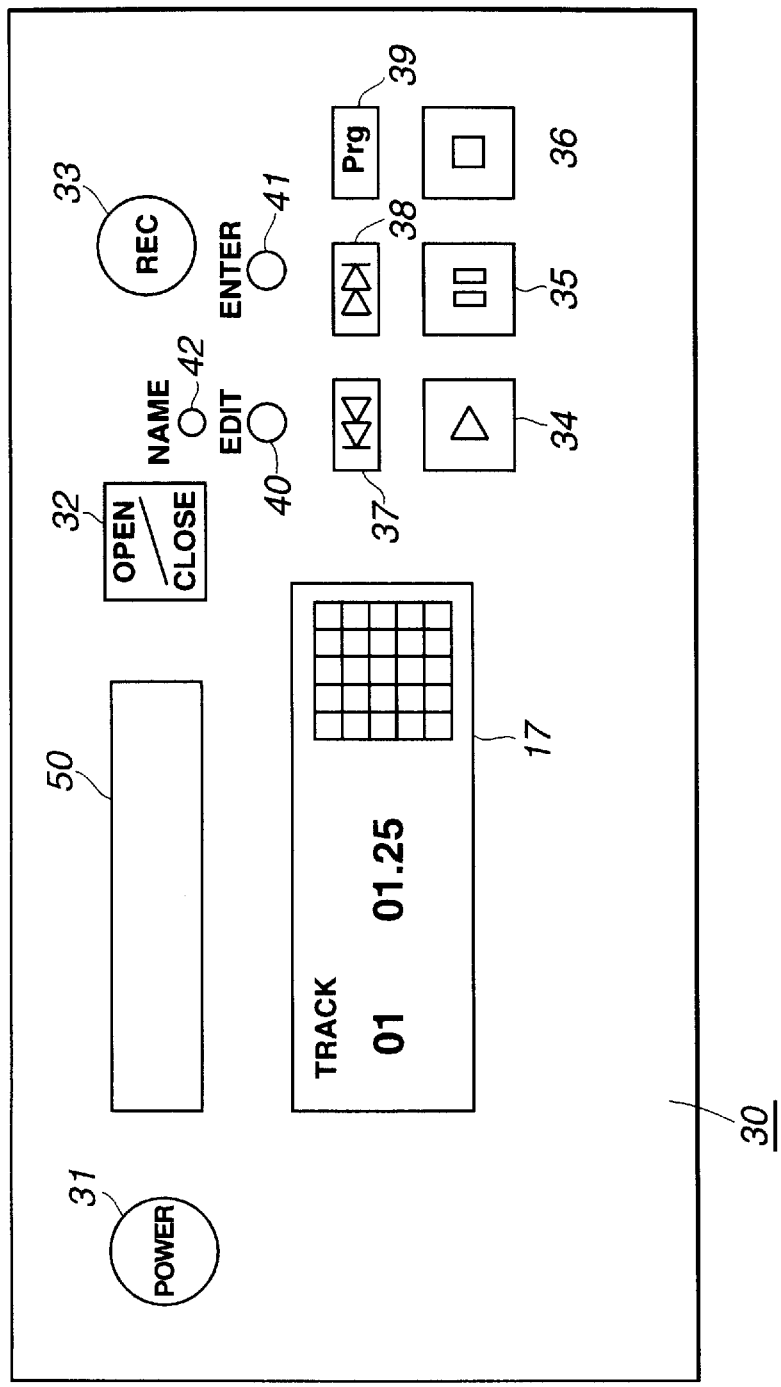
FIG. 5 is a front view showing a front panel n which are arranged an input unit and a display unit of the disc recording/reproducing apparatus.
Figure 6:
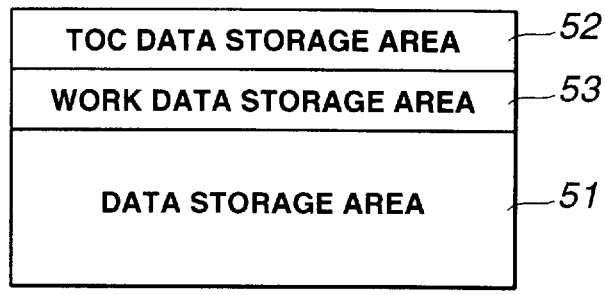
FIG. 6 illustrates a recording area of a RAM constituting the disc recording/reproducing apparatus.
Figure 7:
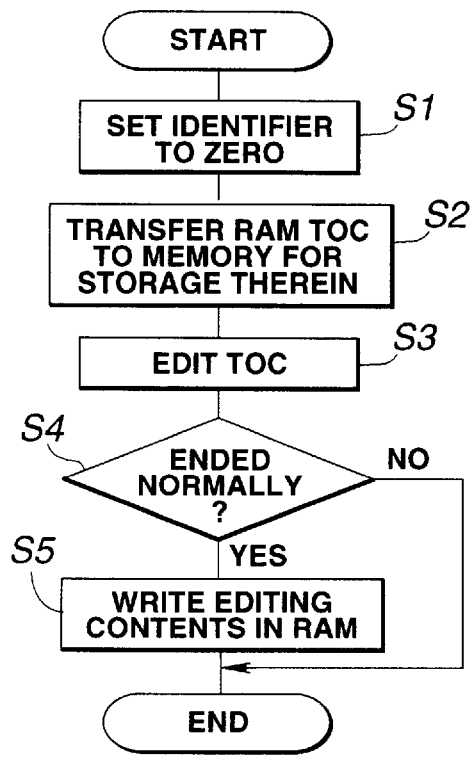
FIG. 7 is a flowchart schematically showing the procedure of the editing operation.

The input unit 18 and the display unit 17 are provided on a front panel 30 of a casing constituting the main body portion of the disc recording/reproducing apparatus, as shown in FIG. 5. The input unit 18 has a power source key 31 and a loading key 32 for pulling out or housing a disc tray 50 configured for loading the optical disc 1, as shown in FIG. 5. The input unit 5 also includes a recording key 33 for selecting the recording mode, a playback key 34 for selecting the playback mode, a pause key 35 for transiently halting the recording/reproducing mode, a stop key 35 for halting the operation, musical number selection/search keys 37, 38 for selecting data recorded on the optical disc 1, and a program mode key 39 for setting the data playback sequence. In particular, the input unit 18 of the disc recording/reproducing apparatus according to the present invention includes an edit key 40, an enter key 41 and a name input key 42 for performing data editing for the management data recording area $RI_2$ of the recording/reproducing area RR.

Meanwhile, the RAM 11 of the disc recording/reproducing apparatus according to the present invention is divided into a data storage area 51 for storing playback data or recording data, such as music data or speech data, and a TOC data recording area 52 for storing TOC data. The RAM 11 also includes a work data storage area 53 for transiently storing TOC data stored in the optical disc 1 for editing.

The present disc recording/reproducing apparatus also includes a memory 19 for storing the TOC data recorded on the optical disc 1. At a time point when the optical disc 1 is loaded on the present recording/reproducing apparatus or immediately before the recording/reproducing operation, the system controlling circuit 9 causes the spindle motor 2 and the optical head 3 to be driven for reading out the TOC data which is then stored in the memory 19.

The specified recording/reproducing operation for the optical disc 1 by the present disc recording/reproducing apparatus is hereinafter explained.

First, the operation of recording data on the recording/reproducing area RR of the optical disc 1 is explained.

For recording speech data on the optical disc 1, the disc tray 50 is pulled out of the main body portion of the apparatus. A desired optical disc 1 is then put on the disc tray 50 which is then pulled into the inside of the main body portion of the apparatus. The disc 1 put on this disc tray 50 is clamped with respect to the spindle motor 2. When the optical disc 1 is clamped with respect to the spindle motor 2, the system controlling circuit 9 causes the spindle motor 2 to be rotated at CLV for running the optical disc 1 in rotation. The system controlling circuit 9 also controls the servo circuit 7 for reproducing the TOC data from the management data recording area $RI_2$ of the recording/reproducing area RR for managing the recording position of the data recording area $DT_2$ of the recording/reproducing area RR. The TOC data reproduced from the management data recording area $RI_2$ of the recording/reproducing area RR is written in the TOC data recording area 52 of the RAM 11.

This recording mode is designated by the user acting on the recording key 33 of the input unit 18 after loading the optical disc 1. This causes the optical disc 1 to be run in rotation at CLV by the spindle motor 2 at the same time as desired speech signals as analog signals are supplied via input terminal 15 to the A/D converter 16. The spindle motor 2 is driven so as to be rotated at constant velocity under control by the servo circuit 7.

The A/D converter 16 quantizes the speech signals and generates speech data at a data rate of 2 CH 44.1 kHz≈1.4 Mbits/sec to route the speech data to the data companding circuit 12.

The data companding circuit 12 operates as an encoder for this recording mode and converts the speech data supplied from the A/D converter 16 into approximately 1,000 frequency components by orthogonal transform of analyzing the time-domain waveform into frequency-domain components, using data of approximately 20 msec at the maximum as a block. The data companding circuit 12 then extracts the frequency components beginning from the psychoacoustically more critical components to form speech data having a 300 kbits/sec data rate. Stated differently, the data companding circuit 12 performs the operation of compressing the speech data with 1.4 Mbits/sec data rate speech data to speech data of one-fifth data rate, that is to 300 kbits/sec data rate speech signals. That is, the data companding circuit 12 converts 75 sectors/sec speech data of the standard CD-DA format to compressed 15 sectors/sec speech data which is outputted.

The speech data compressed by the data companding circuit 12 is transiently stored in the data storage area 51 of the RAM 11.

The compressed speech data, supplied from the data companding circuit 12, has its data transfer rate reduced to one-fifth the standard data transfer rate of 75 sectors/sec, that is to 15 sectors/sec. This compressed speech data is continuously written in the RAM 11 at a transfer rate of 15 sectors/sec, with a cluster as a recording unit. On the other hand, the compressed speech data stored in the RAM 11 is read out in a burst fashion at a data transfer rate of 75 sectors/sec so as to be supplied to the encoder/decoder 6. That is, in the RAM 11, the compressed speech data, continuously written at a low transfer rate of 15 (75/5) in meeting with the bit compression rate, is read out in a burst fashion. The compressed speech data is modulated, and subsequently recorded on the optical disc 1 in a burst fashion, that is so that recording and non-recording occur alternately. Thus, although the overall data transfer rate of the data, thus read out and recorded, inclusive of the non-recording period, is the low rate of 15 sectors per second, the instantaneous data transfer rate in the course of the burst-like recording operation is the above-mentioned 75 sectors/sec. The write/readout of the compressed speech data on or from the RAM 11 is controlled by the memory control circuit 10.

Specifically, the memory controlling circuit 10, controlling the writing of the speech data in the RAM 11 performs memory control in such a manner that the write point W in the RAM 11 is continuously incremented at a transfer rate of 15 sectors/sec for continuously writing the speech data in the RAM 11 at a transfer rate of 15 sectors/sec and, when the data volume of the speech data stored in the RAM 11 exceeds a pre-set amount K, the read pointer R in the RAM 11 is incremented in a burst fashion at a transfer rate of 75 sectors/sec for reading out the speech data from the RAM 11 by the preset data volume K at a transfer rate of 75 sectors/sec.

With the present data recording/reproducing apparatus, in which, under control by the memory controlling circuit 10, the speech data supplied from the data companding circuit 12 at a transfer rate of 15 sectors/sec, for example, is written in the RAM 11 and, if the data volume of the speech data stored in the RAM 11 exceeds the pre-set amount K, the speech data is read out as recording data in a burst fashion from the RAM 11 by the pre-set amount K at a pre-set transfer rate of 75 sectors/sec, the input speech data can be continuously written in the RAM 11 while a data writing area in excess of a pre-set value is maintained at all times in the RAM 11.

The system controlling circuit 9 controls the recording position on the recording track on the optical disc 1 so that the recording data read out in a burst fashion from the RAM 11 will be recorded in a continuous state on the recording track on the optical disc 1. The data writing area in excess of the pre-set amount is maintained at all times in the RAM 11 is maintained at all times in the RAM 11, so that, if the system controlling circuit 9 detects that the laser light spot has become off-track due to disturbances to discontinue the recording operation on the optical disc 11, input speech data may be continuously written in the data writing area of more than the pre-set data volume under memory control by the memory controlling circuit 10, while at the same time the restoration operation can be performed, thus enabling speech data to be recorded on the recording track on the optical disc 1 in a continuous state.

The TOC data written in the speech data recording area 51 is read out as described above so as to be supplied to the encoder/decoder 6. The TOC data, written in the TOC data recording area 52, is supplied to the encoder/decoder 6 after the end of recording of the speech data on the optical disc 1.

The encoder/decoder 6 performs encoding for error correction (parity appendage and interleaving) or EFM encoding on the speech data supplied in a burst fashion from the RAM 11. The speech data encoded by the encoder/decoder 6 is sent to the magnetic head driving circuit 17 which then drives the magnetic head 4 for impressing a magnetic field modulated in accordance with the speech data recorded on the optical disc 1 across the optical disc 1.

In the recording mode, the optical head 3 radiates a laser beam on a target track of the optical disc 1, across which a modulated magnetic field corresponding to the recording data has been impressed by the magnetic head 4 being driven by the magnetic field driving circuit 17. This thermo-magnetically records desired speech data on the data recording area $DT_2$ of the optical disc 1.

In the recording mode, the optical head 3 detects the reflected laser beam radiated on the target track for detecting the focusing errors and the tracking errors by the astigmatic method and by the push-pull method, respectively.

In the recording mode, a detection output from the photodetector of the optical head 3 is supplied to the RF amplifier 5. This RF amplifier 5 extracts the focusing error signal and the tracking error signal from an output of the optical head 3 and routes the extracted signal to the servo circuit 7, while converting the RF signals into bi-level signals and routing the resulting bi-level signals to the encoder/decoder 6.

The servo circuit 7 is made up of, for example, a focusing circuit, a tracking servo circuit, a spindle motor servo circuit and a thread servo circuit.

The focusing servo circuit focusing-controls the optical system of the optical system of the optical head 3 so that the focusing error signal will be reduce to zero. The tracking servo circuit tracking-controls the optical system of the optical system of the optical head 3 so that the tracking error signal will be reduce to zero. The spindle motor servo circuit controls the spindle motor 2 for rotationally driving the optical disc 1 at a constant linear velocity. The thread servo circuit moves the optical head 3 and the magnetic head 4 to the target track position on the optical disc 1 as designated by the system controlling circuit 9.

The servo circuit 7, performing the above-mentioned various control operations, sends the information specifying the operating states of the various operating parts controlled by the servo circuit 7 to the system controlling circuit 9. The system controlling circuit 9 is responsive to the information specifying the operating states of the various operating parts to control the recording positions on the recording track scanned by the optical head 3 and the magnetic head 4.

The system controlling circuit 9 performs control for preparing, during recording of the speech data, a TOC data table, made up of TOC data specifying the recording positions of the data recording area $DT_2$ of the recording/reproducing area RR, in the TOC data recording area 52 of the RAM 11, reading out the TOC data table on termination of recording of the speech data and recording the read-out TOC data table in the management data recording area $RI_2$.

The operation of reading out speech data from the optical disc 1 by the above-described recording/reproducing apparatus is hereinafter explained.

For reproducing speech data from the optical disc 1, the disc tray 50 is pulled out of the main body portion of the apparatus and a desired optical disc 1 is set on the disc tray 50. The disc tray 50 is then pulled into the main body portion of the apparatus and the optical disc 1 set on the disc tray 50 is clamped with respect to the spindle motor 2. When the optical disc 1 is clamped on the spindle motor 2, the system controlling circuit 9 causes the spindle motor 2 to be run in rotation at CLV for rotationally driving the optical disc 1. The system controlling circuit 9 also controls the servo circuit 7 for reproducing the TOC data from the management data recording area $RI_1$ of the read-only area RO for controlling the playback position of the data recording area $DT_1$ of the read-only area RO of the optical disc 1. The TOC data, reproduced from the management data recording area $RI_1$ of the read-only area RO, are written in the TOC data recording area 52 of the RAM 11.

The system controlling circuit 9 also controls the servo circuit 7 for reproducing the TOC data from the management data recording area $RI_2$ of the recording/reproducing area RR for controlling the playback position of the data recording area $DT_2$ of the recording/reproducing area RR of the optical disc 1. The TOC data reproduced from the management data recording area $RI_2$ of the recording/reproducing area RR is also written in the TOC data recording area 52 of the RAM 11.

Under this condition, the system controlling circuit 9 is in a state of awaiting designation of the playback mode or the recording mode by actuation of the playback key 34 or the recording key of the input unit.

If the playback key 34 is actuated for designating the playback mode, the system controlling circuit 9 causes the spindle motor 2 to be rotated at CLV for rotationally driving the optical disc 1. The system controlling circuit 9 also causes the TOC data written in the TOC storage area 52 in the RAM 11 to be read out to move the optical head 3 in accordance with the read-out TOC data to a position where there is recorded the speech data designated by the optical disc 1.

With the optical head 3 being moved radially of the rotated optical disc 1, the playback signals corresponding to data recorded in the data recording area $DT_1$ of the read-only area RO or in the data recording area $DT_2$ of the recording/reproducing area RR are outputted from the optical head 3. The playback signals obtained from the data recording area $DT_1$ of the read-only area RO are detected as changes in the light volume of the reflected laser light from the target track, while the playback signals obtained from the data recording area $DT_2$ of the recording/reproducing area RR are detected as a difference in the polarization angle of the reflected laser light from the target track, grasped as changes in the light volume. Since the changes in the light volume in the two playback signal differ in light level, for example, from each other, they are outputted by switching the gain of the amplifier amplifying the playback signals by a changeover switch, not shown. The playback signals from the optical head 3 are converted into bi-level signals by the RF amplifier 5 and thence supplied to the encoder/decoder 6. For the playback mode, the encoder/decoder 6 operates as a decoder for EFM decoding or error-correcting the bi-level playback output from the RF amplifier 5, that is the playback data, for reproducing the compressed recorded speech data at a constant transfer rate, for example, at a transfer rate of 75 sectors/sec, and for outputting the reproduced speech data. The compressed speech data is temporarily written in the data storage area 51 of the RAM 11 and subsequently read out under control by the memory controlling circuit 10.

This RAM 11 is controlled in data write/readout by the memory controlling circuit 10 so that the compressed speech data supplied from the encoder/decoder 6 at the transfer rate of 75 sectors/sec are written in the RAM 11 at the transfer rate of 75 sectors/sec. The compressed speech data written in the burst fashion at the transfer rate of 75 sectors/sec in the RAM 11 is read out continuously therefrom at a transfer rate of 15 sectors/sec. The memory controlling circuit 10 performs memory control so that the compressed speech data will be written in the RAM 11 in a burst fashion at the transfer rate of 75 sectors/sec and the compressed speech data thus written will be contiguously read out therefrom at the transfer rate of 15 sectors/sec. In addition, the memory controlling circuit 10 controls the playback position so that the compressed speech signals written in a burst fashion in the RAM 11 under the above-described memory control will be reproduced from the consecutive positions on the recording track of the optical disc 1. Th playback position is controlled by controlling the playback position of the compressed speech signals read ut in a burst fashion from the optical disc 1 by the system controlling circuit 9 for supplying the control signal designating the playback position on the recording track of the optical disc 1 from the system controlling circuit 9. Also, the compressed speech data is read out in a burst fashion. The data is written in the data storage area 51 of the RAM 11 when the volume of the compressed speech data stored in the data storage area 51 reaches a pre-set volume L. This control is also performed by the memory controlling circuit 10.

With the present data recording/reproducing apparatus, in which, by such memory control by the memory controlling circuit 10, the compressed speech data is read out in a burst fashion from the recording track of the optical disc 1 at the transfer rate of 75 sectors/sec and written in the RAM 11, while the compressed data is continuously read out from the RAM 11 at a transfer rate of 15 sectors/sec, the compressed speech data can be continuously read out from the RAM 11 while a data volume in excess of the pre-set volume K is maintained at al times in the RAM 11. In addition, since the volume of the compressed speech data exceeding the pre-set volume L is stored at all times in the RAM 11, the volume of the compressed speech data in excess of the pre-set volume L can be read out to continue the outputting of analog signals, as later explained, even if the system controlling circuit 9 has detected that the laser light spot is off-track due to disturbances and has caused interruption of the playback operation for the optical disc 1. The operation of restoration can be carried out in the interim.

The speech data recorded in the data recording area 51 of the RAM 11 is supplied to the data companding circuit 12. The data companding circuit 12 expands the input compressed speech data, by way of a reverse operation to the speech compression, and outputs the resulting expanded data to the D/A converter 13. The D/A converter 13 converts the expanded data into analog signals which are outputted at an output terminal 14. The analog signals outputted at the output terminal 14 are sent to an electro-acoustic transducer, such as a speaker, so as to be reproduced as sound.

The editing operation of data such as musical data or speech data recorded on the optical disc 1 is now explained.

In the editing operation, the operation of erasing data, dividing data into plural data, connecting plural data into one data, moving data or appending or changing the title, are carried out.

The erasure of data on the optical disc 1 is carried out by rewriting management data of the management data recording area $RI_2$ of the recording/reproducing area RR instead of by actually erasing data of the data recording areas $DT_1$ or $DT_2$ shown in FIG. 1.

For carrying out the above-described editing operation, the program mode key 39 on the input unit 18 is acted upon for selecting the editing operating mode of rewriting the management data of the management data recording area $RI_2$. If the program mode key 39 is acted upon, the system controlling circuit 9 sets the disc recording/reproducing apparatus to the editing operating mode. If this editing operating mode is set, the system controlling circuit 9 controls the servo circuit 7 for rotating the spindle motor 2 at CLV for rotationally driving the optical disc 1. The system controlling circuit 9 also manages controls for reproducing the management data, that is the TOC data, from the management data recording area $RI_2$ of the recording/reproducing area RR of the optical disc 1. The TOC data reproduced from the management data recording area $RI_2$ of the recording/reproducing area RR is written in the data recording area 52 of the RAM 11.

The system controlling circuit 9 uses an identifier for identifying the state of the editing operation of the TOC data stored in the memory 19 and sets the editing operation depending on this identifier.

Specifically, if, when the power source key 31 of the inputting unit 18 is acted upon and the power source of the disc recording/reproducing apparatus is ON, or if the optical disc 1 is loaded on the disc recording/reproducing apparatus and the speech data is recorded and/or reproduced, the editing operation is preformed, the identifier assumes the value of 0, whereas, if the editing operation is performed under the above condition, the identifier assumes values associated with the respective editing operations. If, for example, the erasure, division, connection, movement and the editing of the name of musical numbers can be performed in the editing operation, the identifier can assume the following values in association with the respective editing operations:

erasure 1 division 2 connection 3 movement 4 name editing 5

If the user acts on an operating key associated with one of the editing operations, that is the program mode key 39, edit key 40, enter key 41 or the name input key 42, an identifier associated with the editing operation is entered. The identifier inputted by acting on this operating key is inputted to the system controlling circuit 9.

If the program mode key 39 is acted upon for setting the editing operating mode, the system controlling circuit 9 initializes the value of the identifier to zero at step S1 before setting the editing operation mode. The memory controlling circuit 10 sends the TOC data stored in the RAM 11 to the memory 19 at step S2 via system controlling circuit 9 for storing the TOC data in the memory 19.

At step S3, the memory controlling circuit 10 performs control corresponding to the editing operation associated with the identifier entered by acting on the actuating key on the input unit 18 in order to carry out the pre-set editing operation.

Specifically, if the edit key 40 on the input unit 18 is acted upon so that the editing operating mode of erasing data in the data recording area $DT_1$ in the read-only area RO or data in the data recording area $DT_2$ in the recording/reproducing area RR is set, the serial number of the musical number associated with the data recorded in the data recording area $DT_2$ of the optical disc 1 is displayed on the display unit 17. If the user selects one or more of the displayed serial numbers, an inquiry as to whether or not data erasure should be done is displayed along with the designated serial numbers on the display unit 17. If the enter key 40 is now acted upon, the memory controlling circuit 10 causes the TOC data of the musical numbers stored in the TOC data storage area 52 of the RAM 11 to be shifted to the work data area 53. The memory controlling circuit 10 then causes erasure of the TOC data associated with the designated serial numbers on the work data area 53. The indication to such effect is then made on the display unit 17 under control by the system controlling unit 9, at the same time as the serial number of the musical number associated with data not to be erased is displayed on the display unit 17.

The system controlling unit 9 then judges at step S4 whether or not the above-mentioned data erasure operation has regularly come to a close. If a given editing operation is judged to have regularly come to a close, the system controlling circuit 9 transfers to step S5 to control the memory controlling circuit 10 to move the TOC data modified on the work data storage area 53 of RAM 11 to the TOC data storage area 52 for storage therein. Specifically, the memory controlling circuit 10 causes the TOC data with erased serial numbers of the musical numbers, recording start address or recording end address to be stored in the TOC data storage area 52 of the RAM 11. At this time, the system controlling circuit 9 controls the encoder/decoder 6 for recording the modified TOC data in the management data recording area RT2 of the recording/reproducing area RR of the optical disc 1. An editing operation is preformed by recording the modified TOC data in this manner on the optical disc 1.

Meanwhile, if the program mode key 39 is acted upon, the editing operating mode is set, and an operating key associated with the operation of dividing one data into plural data, connecting two or more data into one data, moving data or appending or modifying a title to data is actuated for selecting the associated editing mode, the TOC data recorded in the management data recording area RT2 of the recording/reproducing area RR of the optical disc 1 is rewritten, as in the case of the above-mentioned erasing operation, for carrying out the associated editing operation. The pre-change TOC data is again stored in the memory 19.

If a given editing operation is judged to have not regularly come to a close, the editing operation is terminated, with the identifier value being set to zero. The editing operation does not regularly come to a close if, for example, the operation of connecting two or more data into one data has not been made successfully.

Figure 8:
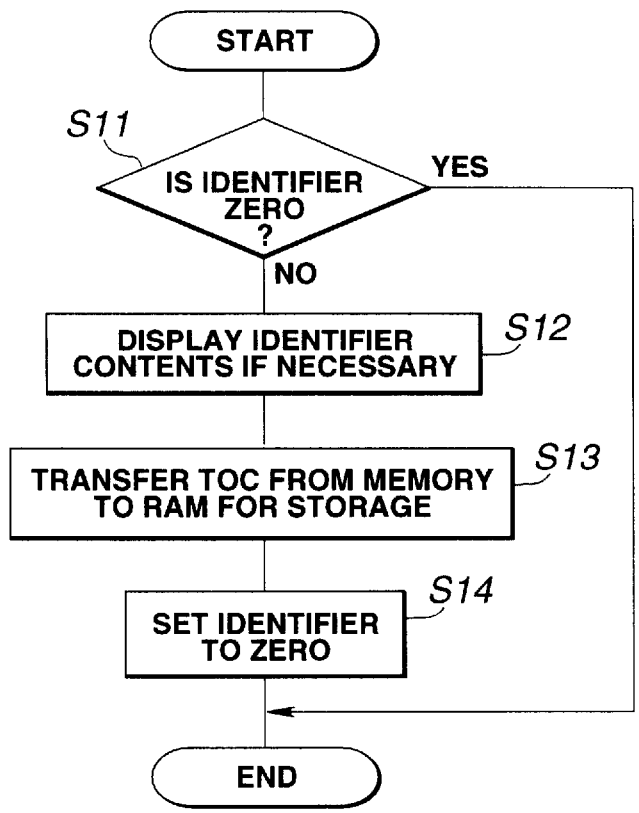
FIG. 8 is a flowchart schematically showing the procedure of canceling the editing operation.

After a given editing operation has regularly come to a close, this editing operation can be canceled. The operation of canceling this editing operation is now explained by referring to the flowchart of FIG. 8.

The pause key 35 for selecting the pause mode of the disc recording/reproducing apparatus may be used simultaneously as the operating key used for canceling the editing operation provided on the input unit 18. If the operating key for canceling the editing operation is acted upon, the editing canceling information is entered to the system controlling circuit 9. On entry of the editing canceling information, it is checked at step S11 whether or not the identifier is not equal to zero. That is, it is checked whether or not the editing operation has been carried out regularly.

If the system controlling circuit 9 judges that the value of the identifier is equal to zero, the editing operation of erasure, division, connection, movement of name editing is not selected, or an editing operation has not come to a close successfully. Thus the processing is terminate without performing the editing canceling operation.

If the value of the identifier is judged to be not equal to zero, the system controlling circuit 9 transfers to step S12 for causing the contents of the editing operation specified by the identifier then set to be displayed on the display unit 17 in case of necessity, in order to ask the user to confirm the contents of the editing operation then performed.

Then, at step S13, the system controlling circuit 9 reads out the pre-change TOC data and routes the read-out data to the memory controlling circuit 10. The memory controlling circuit 10 then causes the pre-change TOC data to be stored in the data storage area 52. If necessary, the TOC data stored n the memory 19 may be displayed on the display unit 17 in order for the user to confirm the contents.

Subsequently, when the power source key 31 of the input unit 18 is acted upon to turn off the power source of the disc recording/reproducing apparatus, or when the optical disc 1 is ejected from the disc recording/reproducing apparatus, the pre-change TOC data stored in the TOC storage area 52 of RAM 11 is read out, while the encoder/decoder 6 is controlled by the system controlling circuit 9 so that the TOC data such as pre-change data erased or pe-change serial number is recorded in the management data recording area $RI_2$ of the recording/reproducing area RR of the optical disc 1 for restoration to the pre-editing state.

Since the TOC data prior to the editing operation is stored for each editing operation, the TOC data prior to the editing operation can be restored after the end the editing operation.

Industrial Utilizability

In the method and apparatus for recording and/or reproducing a recording medium according to the present invention, if a controller performs an editing operation of data recorded in a data recording area of a recording medium based on management data stored in a first storage unit, the controller causes management data stored in the first storage unit to be transferred to a second storage unit and subsequently performs data editing to update the management data stored in the first storage unit. For canceling the editing operation, the controller causes the management data stored in the second storage unit to be transferred to the first storage unit for re-recording on the recording medium. Thus the editing operation can be canceled such that inadvertent data erasure can be prohibited to prevent mistaken operations.

We claim:

1. A recording and/or reproducing apparatus for a recording medium comprising:

head means for recording on and/or reading out data from a recording medium having a data recording area for data recording/reproduction and a management data recording area for recording management data for management of the data recorded in said data recording area;

first storage means for storing data read out from the recording medium by said head means during reproduction from said recording medium, said first storage means during recording on said recording medium temporarily storing recording data supplied to said head means and storing the management data read out from the recording medium;

second storage means for storing the management data read out from said recording medium; and control means for controlling said head means based on the management data stored in said first storage means for effecting recording on or reproduction from said recording medium; wherein said control means during recording the data on said recording medium causing data stored on said first storage means to be temporarily accumulated and to be subsequently supplied to said head means for performing a recording operation; said control means during reproduction of data from said recording medium causing data read out by said head means to be temporarily stored in said first storage means, said control means performing an editing operation on data recorded in said data storage area of the recording medium based on the management data stored in said first storage means for updating the management data stored in said first storage means, said control means during cancellation of the editing operation causing the management data stored in said second storage means to be transferred to said first storage means.

2. The recording and/or reproducing apparatus for a recording medium as claimed in claim 1 wherein, when performing the editing operation on data recorded in the data recording area of the recording medium based on the management data stored in said first storage means, said control means causes the management data stored in said first storage means to be transferred to said second storage means and subsequently performs the editing operation for updating the management data stored in said first storage means.

3. The recording and/or reproducing apparatus for a recording medium as claimed in claim 1 wherein said control means does not update the management data stored in said first storage means if said editing operation has not been performed correctly.

4. The recording and/or reproducing apparatus for a recording medium as claimed in claim 1 wherein said first storage means includes a first storage area for storing management data read out from the management data area of said recording medium during recording or reproduction, and a second storage area for storage during recording of data recorded in the data area of the recording medium and for storage during reproduction of data read out from the data area of said recording medium.

5. The recording and/or reproducing apparatus for a recording medium as claimed in claim 1 further comprising input means for inputting start and cancellation of said editing operation to said control means.

6. A recording and/or reproducing apparatus for a recording medium comprising:
head means for recording on and/or reading out data from a recording medium having a data recording area for data recording/reproduction and a management data recording area for recording management data for management of the data recorded in said data recording area;
first storage means for storing, during reproduction from said recording medium, the data read out by said head means from the recording medium;
second storage means for storing the management data transferred thereto from said first storage means in which it has been stored; and
control means for controlling said head means based on the management data stored in said first storage means for effecting recording on or reproduction from said recording medium; wherein when performing the editing operation for data recorded in the data recording area of the recording medium based on the management data stored in said first storage means, said control means causes the management data stored in said first storage means to be transferred to said second storage means and subsequently performs the editing operation for updating the management data stored in said first storage means, said control means during cancellation of said editing operation causing the management data stored in said second storage means to be transferred to said first storage means.

7. The recording and/or reproducing apparatus for a recording medium as claimed in claim 6 wherein said control means does not update the management data stored in said first storage means if said editing operation has not been performed correctly.

8. The recording and/or reproducing apparatus for a recording medium as claimed in claim 6 further comprising input means for inputting start and cancellation of said editing operation to said control means.

9. A method for recording on and/or reproducing from a recording medium comprising:
reading out management data from a recording medium for storage in first storage means, said recording medium having a data recording area for data recording or reproduction by head means and a management data recording area having recorded therein said management data for data recorded in said data recording area;
transferring said management data stored in said first storage means to a second storage means when performing an editing operation on data recorded in said data recording area of said recording medium based on the management data stored in said first storage means; and
subsequently performing said editing operation for updating the management data stored in said first storage means, and transferring, on entry of cancellation of the editing operation during or after the end of said editing operation, the management data stored in said second storage means to said first storage means.

10. The recording and/or reproducing method for a recording medium as claimed in claim 9 wherein said control means does not update the management data stored in said first storage means if said editing operation has not been performed correctly.

* * * * *